US009600826B2

(12) United States Patent
Benzarti et al.

(10) Patent No.: US 9,600,826 B2
(45) Date of Patent: Mar. 21, 2017

(54) LOCAL METRIC LEARNING FOR TAG RECOMMENDATION IN SOCIAL NETWORKS USING INDEXING

(75) Inventors: Mohamed Aymen Benzarti, Paris (FR); Boris Chidlovskii, Meylan (FR); Nishant Vijayakumar, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 1325 days.

(21) Appl. No.: 13/036,209

(22) Filed: Feb. 28, 2011

(65) Prior Publication Data

US 2012/0219191 A1    Aug. 30, 2012

(51) Int. Cl.
*G06F 15/18* (2006.01)
*G06Q 30/02* (2012.01)
*G06Q 50/00* (2012.01)
*G06K 9/00* (2006.01)

(52) U.S. Cl.
CPC ..... *G06Q 30/0201* (2013.01); *G06K 9/00677* (2013.01); *G06Q 50/01* (2013.01)

(58) Field of Classification Search
CPC ............................... H04L 51/32; G06Q 50/01
USPC ..................... 707/748; 706/12, 45
See application file for complete search history.

(56) References Cited

U.S. PATENT DOCUMENTS

| 7,668,821 | B1 | 2/2010 | Donsbach et al. |
| 7,680,341 | B2 | 3/2010 | Perronnin |
| 7,756,341 | B2 | 7/2010 | Perronnin |
| 2007/0078832 | A1 | 4/2007 | Ott, IV et al. |
| 2008/0069456 | A1 | 3/2008 | Perronnin |
| 2009/0063568 | A1 | 3/2009 | Choe et al. |
| 2010/0191743 | A1 | 7/2010 | Perronnin et al. |
| 2010/0228691 | A1* | 9/2010 | Yang et al. ............... 706/12 |
| 2010/0250556 | A1* | 9/2010 | Park et al. ............... 707/749 |
| 2011/0211764 | A1* | 9/2011 | Krupka et al. ............... 382/225 |
| 2012/0143797 | A1* | 6/2012 | Wang et al. ............... 706/12 |

OTHER PUBLICATIONS

K. Q. Weinberger, L. K. Saul, S. Roweis, "Distance Metric Learning for Large Margin Nearest Neighbor Classificaiton" (hereinafter Weinberger et al.).*

(Continued)

*Primary Examiner* — David Vincent
(74) *Attorney, Agent, or Firm* — Fay Sharpe LLP (57) ABSTRACT

A tag recommendation for an item to be tagged is generated by: selecting a set of candidate neighboring items in an electronic social network based on context of items in the electronic social network respective to an owner of the item to be tagged; selecting a set of nearest neighboring items from the set of candidate neighboring items based on distances of the candidate neighboring items from the item to be tagged as measured by an item comparison metric; and selecting at least one tag recommendation based on tags of the items of the set of nearest neighboring items. The item comparison metric may comprise a Mahalanobis distance metric trained on the set of candidate neighboring items to correlate the trained Mahalanobis distance between pairs of items of the set of candidate neighboring items with an overlap metric indicative of overlap of the tag sets of the two items.

14 Claims, 3 Drawing Sheets

(56) References Cited

OTHER PUBLICATIONS

C. A. Yeung, N. Gibbins, N. Shadbolt, "Discovering and Modeling Multiple Interests of Users in Collaborative Tagging Systems" (hereinafter Yeung).*
Jay Devore, "Probability and Statistics", 2004, sixth edition, pp. 496-632.*
Rae et al., "Improving Tag Recommendation Using Social Networks," In: RIAO 2010: 9th international conference on Adaptivity, Personalization and Fusion of Heterogeneous Information, Apr. 27-30, 2010.
Weinberger et al., "Distance Metric Learning for Large Margin Nearest Neighbor Classification," Proc. NIPS (2005).
Hovelynck et al., "Multi-modality in One-class Classification," Proc. WWW '10 Conference, pp. 441-450, Apr. 28-30, 2010.
Garg et al., "Personalized, Interactive Tag Recommendation for Flickr," In ACM Conference on Recommender Systems, pp. 67-74, Oct. 23-25, 2008.
Sigurbjornsson et al., "Flickr Tag Recommendation based on Collective Knowledge," International conference on World Wide Web, pp. 327-336, Apr. 21-25, 2008.
Grant et al., "CVX: Matlab Software for Disciplined Convex Programming," at http://cvxr.com/cvx/download, last visited on Dec. 10, 2010.
flickr API, at www.flickr.com/services/api/, last visited on Dec. 10, 2010.
Chang et al., "LIBSVM—A Library for Support Vector Machines," at htt;:://www.csie.ntu.edu.tw/~cjlin/libsvm/, last visited on Dec. 10, 2010.

* cited by examiner

LOCAL METRIC LEARNING FOR TAG RECOMMENDATION IN SOCIAL NETWORKS USING INDEXING

BACKGROUND

The following relates to the electronic networking arts, electronic social networking arts, automated tagging or tag recommendation arts, single-label and multi-label distance metering arts, and so forth.

Electronic social networks provide a convenient way for persons or entities to build and maintain relationships with other people or entities. Many social networks are advantageously based on the Internet so as to have global scope. Examples include Facebook® (available at http://www.facebook.com/, last accessed Dec. 9, 2010) and MySpace® (available at http://www.myspace.com/, last accessed Dec. 9, 2010). Some Internet-based electronic social networks are intended for a specific use. For example, Flickr® (available at http://www.flickr.com/, last accessed Dec. 9, 2010) is an electronic social networking cite focused on photograph sharing, while Youtube® (available at http://www.youtube.com/, last accessed Dec. 9, 2010) is focused on video sharing. As another example, LinkedIn® (available at http://www.linkedin.com/, last accessed Dec. 9, 2010) is focused on business networking. (In this regard, electronic "social" networking is to be understood as encompassing networking between persons and individuals regardless of the specific purpose, that is, a social network is not necessarily for socializing but may additionally or alternatively have another purpose such as business networking.)

While an Internet-based electronic social network has substantial advantages, an electronic social network can also be implemented in another computer network such as a corporate or government intranet. Moreover, some users may access an Internet-based electronic social network via an Internet-connected intranet or the like.

In a typical electronic social network, each (individual or entity) user creates a user account, and items uploaded by the user (such as photographs, video clips, text, or so forth) are owned by that user. (Said another way, the user who uploaded an item is the item owner). Networking occurs by creating links between users, usually by the mechanism of one user requesting to be linked with another user. In some networks the other user must accept the request to complete the linking process. The terminology for the linking process varies amongst various electronic social networks. For example, in Facebook® the process of one user linking with another is termed "friending" (that is, making a friend). In LinkedIn® the analogous operation is termed "making a connection". The impact of a link also varies amongst social networks, and may be user controllable. For example, in some social networks the user can designate content as "public" or "private"—the public content can be viewed by anyone, whereas only persons or entities linked with the user can view the private content. Some social networks also allow various levels of linkage. For example, Flickr® enables designation of a link as "family" or "friend" (or both), and content can be made available publicly, or to only family, or to only friends, or to only friends and family.

Content retrieval is a significant problem in electronic social networks. A global Internet-based electronic social network may contain millions (or more) items. For example, as of September 2010, Flickr® reached five billion photographs on its network, with more than 3000 images being uploaded each minute. See http://blog.flickr.net/en/2010/09/19/5000000000/, last accessed Dec. 9, 2010. Sorting through such a large database to retrieve photographs of interest is challenging. One built-in tool for this purpose is sorting by user ownership, i.e. a person searching for a particular item (or type of item) may limit the search to items owned by a particular user.

Another tool provided by many electronic social networks is item tagging. In this approach, a user who uploads an item can tag the item with one or more textual descriptors. The tags are thus metadata associated with the item. By way of illustrative example, a photograph may be tagged with the location and/or date/time at which the photograph was taken, names of persons, objects, or other features appearing in the photograph, the name of the photographer (who may, in general, be different from the user who "owns" the photograph as the term "own" is used in the social network context), and so forth. By way of such tags, the photograph is given a kind of "semantic" context so as to facilitate keyword-based or query-based searching for item discovery and retrieval.

The effectiveness of item tagging is dependent upon the choice of tags assigned to the item. It is not sufficient for the tags to be descriptive of the item from the point of view of the item owner—rather, the tags should be descriptive from the point of view of a typical person searching for that type of item. The tags should employ terminology that is likely to be used in search queries. This goal can be thwarted by a user who assigns tags that make sense to the user, but that (for whatever reason) are different from the tags that most other persons or entities would choose to provide semantic context for the item.

Tag recommendation is a potential solution to this problem. A tag recommendation system may, for example, operate when an item is uploaded to provide one or more recommended tags for the item. The item owner can then choose whether to assign recommended tag to the uploaded item. The recommended tags are not generated by the item owner, and thus are not from the item owner's viewpoint and may be more likely to be descriptive from the point of view of a typical person searching for that type of image.

The following sets forth improved methods and apparatuses.

BRIEF DESCRIPTION

In some illustrative embodiments disclosed as illustrative examples herein, a storage medium stores instructions executable by a processing device to perform a method comprising generating at least one tag recommendation for an item to be tagged by: selecting a set of candidate neighboring items in an electronic social network based on context of items in the electronic social network respective to an owner of the item to be tagged; selecting a set of nearest neighboring items from the set of candidate neighboring items based on distances of the candidate neighboring items from the item to be tagged as measured by an item comparison metric; and selecting the at least one tag recommendation based on tags of the items of the set of nearest neighboring items. In some embodiments the item comparison metric comprises a Mahalanobis distance metric operating on feature vector representations of items.

In some illustrative embodiments disclosed as illustrative examples herein, a method comprises generating at least one tag recommendation for an item to be tagged by: training a Mahalanobis distance metric on a set of candidate neighboring items in an electronic social network; selecting a set of nearest neighboring items from the set of candidate neighboring items based on distances of the candidate neighboring items from the item to be tagged as measured by the trained Mahalanobis distance metric, and selecting the at least one tag recommendation based on tags of the items of the set of nearest neighboring items. The generating is suitably performed by a digital processing device. In some embodiments the Mahalanobis distance metric is trained on the set of candidate neighboring items to optimize a correlation between (i) the trained Mahalanobis distance between pairs of items of the set of candidate neighboring items and (ii) an overlap metric indicative of overlap of the tag sets of the two items.

In some illustrative embodiments disclosed as illustrative examples herein, an apparatus comprises a digital processing device configured to perform a method including training a Mahalanobis distance metric operating on feature vector representations of items on a set of training items. The training optimizes a correlation between (i) the trained Mahalanobis distance between pairs of training items (i, j) selected from the set of training items and (ii) an overlap metric indicative of overlap of sets of tags associated with the respective training items i and j. In some embodiments the overlap fraction is proportional to $|T_i \cap T_j|/(|T_i|+|T_j|)$ where $T_i$ denotes the set of tags associated with the training item i and $T_j$ denotes the set of tags associated with the training item j. In some embodiments the digital processing device is further configured to select K nearest neighboring items from the set of training items based on distances of the training items from a reference item as measured by the trained Mahalanobis distance metric, where K is an integer greater than one.

DETAILED DESCRIPTION

Figure 1:
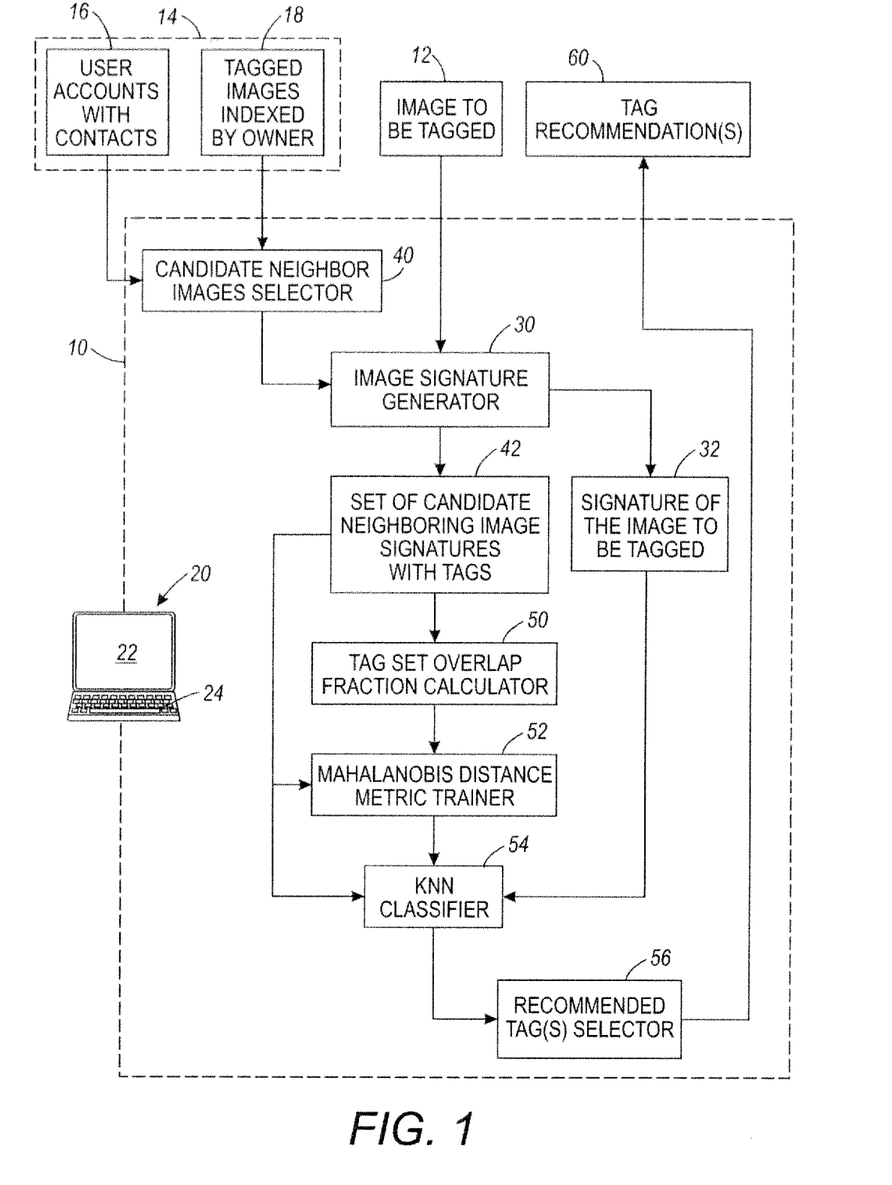
FIG. 1 diagrammatically shows a tag recommendation system.

With reference to FIG. 1, a tag recommendation system 10 is described for generating tag recommendations for a user's image to be tagged 12. While the illustrative tag recommendation system generates tag recommendations for images, the tag recommendation systems and methods disclosed herein are applicable to tagging items generally, such as images, video clips, audio clips, audio/video clips, or so forth. Moreover, the term "item" as used herein is also intended to encompass groups of items in which the group can be tagged to provide a semantic description of its content. Illustrative the tag recommendation system 10 operates in the context of an electronic social network 14 that includes user accounts 16 with contacts information, and tagged images 18 indexed by owners. A user account of the accounts/contacts 16 includes identifying information about the user and information about contacts, that is, other associated users. A user may be an individual, or in some embodiments may be an entity, such as a corporation, governmental entity, non-profit organization, or so forth. From the viewpoint of a given user, a contact is another user that is associated with the given user. Terminology and the precise nature of the association depends upon the configuration of the electronic social network. For example, in the case of Facebook® contacts are referred to as "friends". In the case of Flickr® contacts are referred to as "friends" or "family", and a given contact may be classified as friend, family, or both friend and family. These are merely illustrative examples. As a further clarification, it is to be understood that not all images of the tagged images 18 are necessarily tagged with tags. However, it is expected that most of the images 18 have a set of tags comprising one or more tags associated therewith. As with the term "contact", the terminology corresponding to "tag" may differ amongst different electronic social networks. For example, some social networks may refer to image tagging with tags, whereas some social networks may refer to image labeling with labels, or so forth. A tag is to be understood to be metadata associated with the image (or, more generally, associated with the item). Typically, tags are textual, e.g. keywords or key-phrases or the like; however, it is also contemplated for a tag to comprise non-textual metadata such as a timestamp represented in some non-textual format, or a thumbnail image tag, or so forth. Each image of the images 18 is uploaded to the electronic social network 14 by a user who is typically the owner of the image. More generally, a given image (or, more generally, item) is owned by an owner. The owner is a user of the electronic social network 14, that is, the owner is one of the users represented by the user accounts 16. The term "owner" as used herein is intended to denote the owner of the image (or item) in the context of the electronic social network 14, and is not necessarily identical with the legal owner (e.g., copyright holder) or creator of the image (or item).

The owner of the image 12 to be tagged is assumed to have a set of contacts. A user typically, not necessarily, has a set of contacts. Exceptions include new users who have not yet established any contacts, or a person or entity who has created a user account (and hence is a "user") but never actually uses the electronic social network 14 and hence never establishes any contacts. The owner of the image 12 to be tagged is also assumed to own additional images besides the image 12. Again, this is typical but not necessary—for example, it is possible that the image 12 is the first image uploaded to the social network 14 by the owner of the image 12.

The tag recommendation system 10 reflects certain observations about electronic social networks. Tags are chosen by the owner of an uploaded item, for example using a free form text entry dialog, a drop-down list, or so forth. Accordingly, the choice of tags represent the item owner's individual choice. Nonetheless, it is expected that some common usage themes can emerge as users tend to use "typical" tags in constructing the semantic description of a given type of item. Thus, the existing tagged images 18 can form a basis for tag recommendation, and the tag recommendation system 10 utilizes this information. The tag recommendation system 10 takes into account both similarity to other images 18 in the social network, and the social context of the image 12 to be tagged (or of the owner of the image 12 to be tagged).

Some embodiments of the tag recommendation system 10 employ a K-nearest neighbors (KNN) approach that is extended by using both image features (or item features) and the social content of the owner of the image 12 to be tagged to guide the selection of candidate neighboring items. For example, the candidate neighboring items may be limited to the set of images owned by the owner of the image 12 to be tagged, optionally further including contacts of the owner. In some embodiments, the KNN approach employs a local distance metric in assessing the nearest neighbors, thus enabling the tag recommendation system 10 to adjust to a specific context. In some embodiments, a Mahalanobis distance metric is employed, which as disclosed herein may be extended to multi-tag (that is, multi-label) applications.

The tag recommendation system 10 can operate in various modes, such as in bootstrap, querying, and/or search modes. In the bootstrap mode, the tag recommendation system 10 suggests tags for newly uploaded images (or items) by observing the characteristics of the images as well as their social context. The bootstrap mode may be initiated by the upload operation so that the user is immediately presented with recommended tags, or may be a selectable option (e.g., when the user uploads the image a selection button is provided by which the user can select to receive tag recommendations). In the query mode, a user annotating an image with tags invokes the tag recommendation system 10 to obtain recommended tags that can extend the existing image tags. Both modes can ease the annotation task for the user and help expand the coverage of the tags annotating the images. Typically, the annotator in bootstrap or query mode is the owner of the image, and the tag recommendation system 10 is invoked by the owner (either explicitly or implicitly as an automatic response to uploading the image) and the recommended tags are displayed to the owner. However, it is also contemplated that some electronic social networks may allow other users besides the owner to annotate an image (or item), and in such embodiments a user other than the owner may invoke the tag recommendation system 10 and receive the tag recommendations.

In search mode, the role of the tag recommendation system 10 is to provide search recommendations. This can be achieved by automated query expansion or through an interactive process of adding query terms. One suitable operational mode for employing the tag recommendation system 10 in search mode is to request constructing a search query based on an existing image, that is, to find similar images. The image that is the basis of the search query is input to the tag recommendation system 10 and the displayed recommended tags are suggested for incorporation into a textual search query (or textual portion of the search query).

The tag recommendation system 10 is suitably embodied by a computer 20 or other digital processing device. A typical electronic social network is physically embodied by a network server (which may be a collection of servers, optionally defining a computing cloud or distributed computing system, and/or optionally in which various individual servers may be added or removed over time, possibly in an ad hoc manner, to accommodate load variations on the electronic social network) executing suitable software and including or having access to suitable data storage for storing the social network data 16, 18, with the network server being accessed by various users via the Internet and/or another computer network using personal computers, notebook computers, personal data assistant (PDA) devices, smartphones, tablet computers, or so forth. Multiple users may be connected with the electronic social network simultaneously (that is, multiple users may be "online" simultaneously).

In this setting, in some embodiments the tag recommendation system 10 is embodied by a digital processing device comprising the network server (which, again, may itself actually be embodied by a computing cloud or distributed computing system) in the form of a software or firmware application, module, or the like comprising instructions executing on the network server. In these embodiments the tag recommendation system 10 may, for example, appear to the user as a service provided to the user by the electronic social network.

In some embodiments, the tag recommendation system 10 is embodied by a digital processing device comprising the local digital processing device accessed by the user (again, by way of illustrative example, possibly a personal computer, notebook computer, PDA, smartphone, tablet computer, or so forth) in the form of a software or firmware application, module, or the like comprising instructions executing on the local digital processing device. In these embodiments, it is to be understood that the local digital processing device downloads relevant information for tag recommendation operations (e.g., relevant portions of the social network images 18 and the user account/contacts information 16) from the network server via the Internet and/or other computing network providing communication between the network server and the local digital processing device. In these embodiments, the tag recommendation system may, for example, appear to the user as a device application (or "app") that can be downloaded to the local digital processing device.

Whether the tag recommendation system 10 is embodied on the network server or on the local digital processing device (e.g., computer, PDA, smartphone, or so forth) employed by the user, the tag recommendation system 10 interacts with the user via suitable user interfacing hardware included with or accessed by the local digital processing device. In FIG. 1, illustrative user interfacing hardware includes a display 22 and a keyboard 24, which are shown by way of illustrative example. In various embodiments, the user input device may include the illustrative keyboard, and/or a mouse, trackball or other pointing device, or a touch-sensitive screen (optionally implementing a virtual keyboard), or so forth. The display 22 may be variously embodied depending upon the type of local digital processing device, and may for example be a computer display, a PDA display, a smartphone display, or so forth.

It is also to be understood that the disclosed tag recommendation system and method embodiments may be embodied as a storage medium storing instructions executable by a processing device (for example, the network server or the local digital processing device) to perform the disclosed tag recommendation operations. For example, the storage medium may comprise a hard disk or other magnetic medium; or random access memory (RAM), read-only memory (ROM), FLASH memory, or another electronic memory; or an optical disk or other optical storage medium; or so forth. In embodiments in which the tag recommendation system 10 runs on the local digital processing device, the storage medium may take the form of data storage of an online or Internet-based application store from which the tag recommendation "app" may be downloaded.

With continuing reference to FIG. 1, the illustrative tag recommendation system 10 is directed by way of illustrative example to tagging images. (Again, more generally the disclosed tag recommendation approaches are suitably applied to tagging various types of items such as images, video, audio, audio/video, item groups that are taggable, and so forth). For the purpose of applying KNN or another algorithm to identify nearest neighboring images (or items), feature vector representations of items are generated. In the tag recommendation system 10, this function is performed by an image signature generator 30. In the illustrative case of images, the image signature generator 30 suitably generates a vector of visual features for images forming a d-dimensional feature vector describing the image characteristics. In some embodiments, a bag of visual words is used, by way of illustrative example with d=1024. Various suitable approaches for generating a feature vector representation of an image are set forth in (by way of illustrative example) Perronnin, U.S. Pat. No. 7,756,341 issued Jul. 13, 2010; Perronnin, U.S. Pub. No. 2008/0069456 A1 published Mar. 20, 2008; Perronnin, U.S. Pat. No. 7,680,341 issued Mar. 16, 2010; and Perronnin et al., U.S. Pub. No. 2010/0191743 A1 published Jul. 29, 2010, all of which are incorporated herein by reference in their entireties.

Optionally, the image signature generator 30 may also incorporate some non-visual data into the feature vector. For example, some elements of the feature vector may represent textual content from image descriptions or other image metadata, or social features.

The image signature generator 30 is applied to the image 12 to be tagged in order to generate a signature 32 of the image to be tagged. Tag recommendations are to be generated based on tags of the nearest neighboring images of the collection of images 18 of the social network 14. However, since the images 18 may number in the millions or billions, an exhaustive search for the nearest neighboring images is prohibitive. Instead, the tag recommendation system 10 employs a candidate neighboring images selector 40 to identify a sub-set of the images 18 as a set of candidate neighboring images in the electronic social network 14. The selection is based at least on context of items in the electronic social network 14 respective to an owner of the item to be tagged. This context is determined based on the user accounts/contacts information 16. The images of the set of candidate neighboring images selected by the selector 40 are processed by the image signature generator 30 to generate a corresponding set of neighbor image signatures 42, which are tagged with the tags of the source neighbor images. Depending upon the format of the textual tags, they may be pre-processed. For example, the tags may be represented using a "term frequency-inverse document frequency" or TF-IDF representation extracted from image descriptions and comments, with all tags given in free form being equally normalized.

The candidate neighboring images selector 40 chooses the set of candidate neighboring images in the electronic social network 14 based on social context of the owner of the image 12 to be tagged. Various aspects of the owner's social context can be utilized in the image selection, such as the owner's position in the social network optionally including hub and authority scores, different centrality measures, including degree, closeness, betweenness, the clustering coefficient, and so forth. In some embodiments, the set of candidate neighboring images is limited to images owned by the owner of the image 12 to be tagged. In some embodiments, the set of candidate neighboring images is limited to images owned by the owner of the image 12 to be tagged and images owned by users of the electronic social network 14 who are contacts of the owner of the image 12 to be tagged.

In some embodiments, the set of candidate neighboring images is limited to images owned by the owner of the image 12 to be tagged and images owned by users of the electronic social network 14 having between one and N degrees of separation inclusive from the owner of the image 12 to be tagged, where N is an integer greater than or equal to two. For example, if N=2 then the set of candidate neighboring images is limited to (i) images owned by the owner of the image 12 to be tagged and (ii) images owned by users of the electronic social network 14 who are contacts of the owner of the image 12 to be tagged (the N=1 level); and (iii) images owned by users of the electronic social network 14 who are contacts of the contacts of the owner of the image 12 to be tagged (the N=2 level).

In some embodiments, the set of candidate neighboring images is limited to images owned by the owner of the image 12 to be tagged and images owned by L users of the electronic social network 14 who are the L closest contacts of the owner of the image 12 to be tagged. The "closeness" of the L closest users is suitably measured by a user comparison metric which may take into account various closeness factors such as the number of common contacts, the number of cross-references between the users in tags of items owned by the users, or so forth.

Without loss of generality, the following notation is used: C denotes the set of candidate neighboring candidates chosen by the candidate neighboring images selector 40; $C_o$ denotes the set of images owned by the owner of the image 12 to be tagged; and $C_c$ denotes the set $C_o$ plus the set of images owned by contacts of the owner of the image 12 to be tagged (that is, having degree of separation N=1 from the owner of the image 12 to be tagged). With this notation, if the set of candidate neighboring images is all images owned by the owner of the image 12 to be tagged, then $C=C_o$. If the set of candidate neighboring images is all images owned by the owner of the image 12 to be tagged and all images owned by contacts of the owner of the image 12 to be tagged, then $C=C_c$.

Once the set of candidate nearest neighboring images is selected by the selector 40, these images are processed to select a set of nearest neighboring images from the set of candidate neighboring images based on distances of the candidate neighboring images from the image 12 to be tagged. These distances are suitably measured by an image (or item) comparison metric operating on the image signatures or feature vectors 32, 42. In some embodiments, a Euclidean distance $d_E$ is employed as the comparison metric, suitably defined as:

$$d_E(X_i, X_j) = \|X_i - X_j\|^2 = (X_i - X_j)^T (X_i - X_j) \quad (1),$$

where $X_i$ and $X_j$ are feature vectors representing items i and j, respectively. In some embodiments $X_i$ is the signature 32 of the image 12 to be tagged, and the Euclidean distance of Equation (1) is applied with $X_j$ cycling through the signatures 42 of the candidate neighboring images to assess the nearness of each candidate neighboring image to the image 12 to be tagged. In the KNN approach, the top-K nearest neighboring images are selected, and the tag recommendations are generated based on the tags of the top-K nearest neighboring images.

The Euclidean distance, however, does not capitalize on any statistical regularity in the data that might be estimated from a large training set of examples. It is recognized herein that the distance metric used for identifying the nearest neighboring images (or items) can advantageously be adapted to the particular tag recommendation problem being solved.

In the illustrative tag recommendation system 10 of FIG. 1, a Mahalanobis distance metric $d_A$ is employed as the image comparison metric operating on the feature vectors describing the images. The Mahalanobis distance metric is suitably defined as:

$$d_A(X_i, X_j) = (X_i - X_j)^T A (X_i - X_j) \quad (2),$$

where $X_i$ and $X_j$ are feature vectors representing items i and j, respectively, and A is a parameter matrix whose values are optimized by training of the Mahalanobis distance metric. Comparing Equations (1) and (2), it can be seen that the Mahalanobis distance metric generalizes the Euclidean distance by adding the positive semi-defined matrix A having dimensionality (d×d). The Mahalanobis distance metric is equivalent to the (squared) Euclidean distance after applying a linear transform $\Lambda$ to all vectors $X_i$ where $A = \Lambda^T \Lambda$.

The Mahalanobis distance metric is suitably trained inside the KNN routine, by training the Mahalanobis distance metric on the set of candidate neighboring items. The training is premised on the expectation that the K nearest neighboring images often have the same tags while candidate neighboring images with different tags are separated by a large margin. Thus, in some embodiments the Mahalanobis distance metric is trained on the set of candidate neighboring images to minimize an objective function comprising a sum of Mahalanobis distances between feature vectors representing candidate neighboring images with at least one overlapping tag. In a suitable training approach, the Mahalanobis distance metric is trained on the set of candidate neighboring images to optimize a correlation between (i) the trained Mahalanobis distance between two images and (ii) a metric indicative of tag set overlap between the two images.

This training approach can be formulated in terms of a semi-definite program (SDP) operating on sets of feature vectors $(X_i, X_j)$ such that $X_i$ and $X_j$ share the same tag. The objective function is designed to minimize the sum of distances of pairs $(X_i, X_j)$ in the training set S (e.g., the set of candidate neighboring images or items) and to satisfy relative distance constraints. A suitable SDP formulation is as follows:

$$\min_A \Sigma_{(X_i, X_j) \in S} d_A(X_i; X_j) \text{ s.t. } d_A(X_i; X_k) - d_A(X_i; X_j) \geq 1$$
$$\text{for all triples } (X_i; X_j; X_k) \in S \; A >= 0 \quad (3),$$

The semi-definite program is convex, which guarantees that the global minimum can be efficiently achieved. By analogy with the support vector machine (SVM) when not all constraints can be satisfied, slack variables can optionally be introduce to minimize the violation of certain constraints, leading to the following modified SDP:

$$\min_A \Sigma_{(X_i; X_j) \in S} d_A(X_i; X_j) + \Sigma_{(X_i; X_j; X_k) \in S} \xi_{ijk} \text{ s.t. } d_A(X_i; X_k) - d_A(X_i; X_j) \geq 1 - \xi_{ijk} \text{ for all triples } (X_i; X_j; X_k) \in S$$
$$A \geq 0, \xi_{ijk} \geq 0 \quad (4).$$

The distance can be learned globally, yielding one trained matrix A for all instances in the dataset. However, this global approach is impractical for electronic social networks including millions or billions of items, and moreover such a global approach does not benefit from statistical regularity in the local data of a particular tag recommendation operation. Rather, in the illustrative embodiments the training is performed on the set of candidate neighboring images (or items) C. Once candidate set C is constructed by the candidate neighboring images selector 40 for the image 12 to be tagged, the Mahalanobis distance metric $d_A$ is trained with this (local) training set C. The KNN algorithm is then applied on the set C using the trained Mahalanobis distance metric to identify the K nearest neighboring images from the set C respective to the image 12 to be tagged.

Implied in Equations (3) and (4) is the concept of overlapping tags, e.g. image j shares the same tag with the image i, whereas image k does not share the same tag with either image i or image j. Such concepts are straightforward if an image can have only one tag (binary case—the image is tagged with the tag or not). In an electronic social network, however, an image (or item) generally may be tagged with a set of tags, that is, with one, two, three, four, or more tags (indeed, perhaps dozens or more tags). One approach would be to apply a single-tag Mahalanobis distance for each possible tag and then combine the results—however, this is generally prohibitively complex in a social network setting in which there may be hundreds, thousands, or more different tags.

Approaches for multi-tag processing disclosed herein learn a single Mahalanobis distance metric, with a single learned parameter matrix A, for all tags. To do this, an overlap metric is generated that is indicative of overlap of sets of tags associated with the respective training items i and j. In one approach, the overlap metric is binary, that is, overlap metric has a value of 1 or 0. For example, in one binary approach if the two tag sets the images (or items) i and j are identical then the overlap metric is 1, whereas the overlap metric is 0 if there is any difference at all between the two tag sets. In other words, two images are considered (fully) similar if they have all tags the same; otherwise they are (fully) dissimilar. This approach has the advantage of binary processing, but is biased too far away from finding similar images—that is, very few images are likely to have fully identical tag sets. More generally, a binary overlap metric does not effectively capture variations in the amount of tag overlap in multi-tag contexts.

In another approach, the overlap metric is a tag set overlap fraction, by which it is meant that the overlap metric is not binary valued but rather has intermediate values indicative of partial overlap between the tag sets of two images i and j. For example, the tag set overlap fraction may be proportional to $|T_i \cap T_j|/(|T_i|+|T_j|)$ where $T_i$ denotes the set of tags associated with the item i and $T_j$ denotes the set of tags associated with the item j. One suitable tag set overlap fraction having this proportionality relationship is $tov_{ij} = 2|T_i \cap T_j|/(|T_i|+|T_j|)$, which has the advantage that $0 \geq tov_{ij} \geq 1$ (where 0 corresponds to no overlap at all, and 1 corresponds to $T_i = T_j$).

An embodiment of training of the Mahalanobis distance metric that incorporates the illustrative tag set overlap fraction $tov_{ij}$ is as follows. The set R of relative distance constraints on triples $(X_i, X_j, X_k)$ is defined such that $X_i$ and $X_j$ are neighbors with at least one common tag (that is, $tov_{ij} > 0$) while neither $X_i$ nor $X_j$ have a common tag with $X_k$ (that is, $tov_{ik} = 0$ and $tov_{jk} = 0$). The SDP of Equation (4) is then suitably modified as follows to integrate the partial tag overlaps as indicated by $tov_{ij}$:

$$\min_A \Sigma_{(X_i; X_j) \in S} d_A(X_i; X_j) + \Sigma_{(X_i; X_j; X_k) \in S} \xi_{ijk} \text{ s.t. } d_A(X_i; X_k) - d_A(X_i; X_j) \geq tov_{ij} - \xi_{ijk} \text{ for all triples } (X_i; X_j; X_k)$$
$$\in S \; A \geq 0, \xi_{ijk} \geq 0. \quad (5),$$

where S denotes the set of candidate neighboring items, $X_i$ and $X_1$ are feature vectors representing respective items i and j of the set of candidate neighboring items having at least one common tag, and $X_k$ is a feature vector representing an item k of the set of candidate neighboring items having no tag in common with item i and having no tag in common with item j.

With continuing reference to FIG. 1, the tag recommendation system 10 incorporates the foregoing as follows. A tag set overlap fraction calculator 50 computes the tag set overlap fractions $tov_{ij} = 2|T_i \cap T_j|/(|T_i|+|T_j|)$. A Mahalanobis distance metric trainer 52 then trains the Mahalanobis distance metric in accordance with Equation (5), with S being the set of candidate neighboring items selected by the candidate neighbor images selector 40, the to optimize values of the elements of the parameter matrix A. The resulting trained Mahalanobis distance metric is then used by a KNN classifier 54 to identify the K nearest neighboring images to the image 12 to be tagged. A recommended tags selector 56 then selects tag recommendations 60 which are presented to the user. In some embodiments, the recommended tags selector 56 operates by selecting the $m_t$ most frequently occurring tags in the set of K nearest neighbor images, where $m_t$ is the average tag set size for the K nearest neighbor images. In another approach, the top M most frequently occurring tags may be selected, where M is a fixed value (such that the selector 56 always returns M recommended tags).

Instead of the illustrative KNN classifier 54, another algorithm can be employed that selects a set of nearest neighboring images from the set of candidate neighboring images based on distances from the image 12 to be tagged as measured by the trained Mahalanobis metric. For example, instead of selecting the K nearest neighboring images, the selection can be of a set of nearest neighboring images having distance from the image 12 (as measured by the trained Mahalanobis metric) less than some selection threshold. In this variant embodiment, the number of selected nearest neighboring images is not fixed at a predetermined number K.

To evaluate performance of the illustrative tag recommendation system 10 of FIG. 1, tests were performed using a relatively small set of training images. (The training set is "relatively small" as compared with the millions or billions of images in some Internet-based electronic social networks). The evaluation process differs from the illustrative tag recommendation system 10 of FIG. 1 in that the Mahalanobis distance metric training was tested using either the entire training set of images or a local training set selected as per operation of the selector 40 on the training set. For local training, the evaluation process is suitably described by the following pseudocode:

Given a training set S and test set of images
Given the rule to construct the candidate set $S_i$ from S
Given the neighborhood size K
For each image I in the test set
  Extract the candidate set $S_i$ for I from the training set S
  Learn Mahalanobis metric $d_{Ai}$ from images in $S_i$
  For each image J in set $S_i$
    Calculate weights $W_{ij}=d_{Ai}(I, J)$
  Select K images with the smallest $W_{ij}$
  Select all tags of the selected K images
  Calculate $m_i$ as the average size of tag sets of the selected images
  Sort the tags according to their frequency in selected images
  Return the top $m_i$ tags as recommended tags for image I In the case of global learning of the Mahalanobis distance metric, the evaluation process is suitably described by the following modified pseudocode:

Given a training set S and test set of images
Given the neighborhood size K
For each image I in the test set
  Learn Mahalanobis metric $d_{Ai}$ from all images in S
  For each image J in set S
    Calculate weights $W_{ij}=d_{Ai}(I, J)$
  Select K images with the smallest $W_{ij}$
  Select all tags of the selected K images
  Calculate $m_i$ as the average size of tag sets of the selected images
  Sort the tags according to their frequency in selected images
  Return the top $m_i$ tags as recommended tags for image I The evaluation tests employed a set of images from Flickr®. In all cases, the tag recommendation task was performed on images with multiple tags, which images are described with visual, textual and social features. Three series of tests were run on the Flickr® dataset: 1. SVM linear kernel models learned with combinations of visual, textual and social features; 2. Global versus local Mahalanobis metric learning; and 3. KNN with Euclidean and local Mahalanobis distance metrics and different candidate rules.

TABLE 1

SVM baseline results

| | Number of tags | | | |
|---|---|---|---|---|
| | 2 tags | 5 tags | 10 tags | 20 tags |
| Number of images | 42,842 | 77,414 | 110,238 | 147,942 |
| Precision of classification (%) Visual features only | 75.20 | 50.79 | 29.49 | 19.07 |
| Precision of classification (%) Visual + social features | 78.04 | 57.56 | 38.60 | 21.70 |
| Precision of classification (%) Visual + social + textual features | 78.12 | 57.59 | 29.45 | 17.51 |

As a baseline, SVM models were trained for multi-tag classification by combining different features to describing the images. Visual, textual and social features were fused to construct three different sets. The first set contains visual image features only. In the second set the visual features are extended with the social features of their users. In the third set, the textual features of images are also added. SVMLIB software (LIBSVM—A Library for Support Vector Machines, available at http://www.csie.ntu.edu.tw/~cjlin/libsvm/, last accessed Dec. 10, 2010) was run in the multi-label mode where we retain only images with 2, 5, 10 and 20 most frequent tags. Table 1 shows the number of images for each case and the precision of SVM models run with 5 folds.

It is seen in Table 1 that the accuracy drops quickly with the increasing numbers of tags in all cases. Adding social user features to the image features improves the accuracy in all cases, while adding the textual features does not increase the performance of classifiers; this is likely caused by the noisiness and sparseness of textual description of images.

In the second series of evaluation tests the Mahalanobis distance metric learning as disclosed herein was tested on the Flickr® dataset. The following tests were performed.

Different features sets (visual, textual and social) were tested as follows. Principal component analysis (PCA) was used to reduce dimensionality of feature vectors and speed up the training. In all cases, the d-vectors $X_i$ were reduced by PCA to 50 principal components before learning the Mahalonobis distance metric and then comparing the Mahalanobis distance to the Euclidean distance. Similarly to SVM models, the combination of visual and social features performed the best.

Metric learning for multi-tag cases was tested as follows. Three versions of the Mahalanobis distance metric learning were implemented and tested. Five runs were performed: in each run 80% is randomly selected for training and remaining 20% is used for testing.

Global versus local metric learning was tested as follows. A global Mahalanobis distance metric was learnt from 5,000 images randomly selected from the entire set (results are averaged over 5 runs). For the local metric learning, one user was selected randomly for the metric learning; the tag prediction error was averaged over 50 different users.

Figure 2:
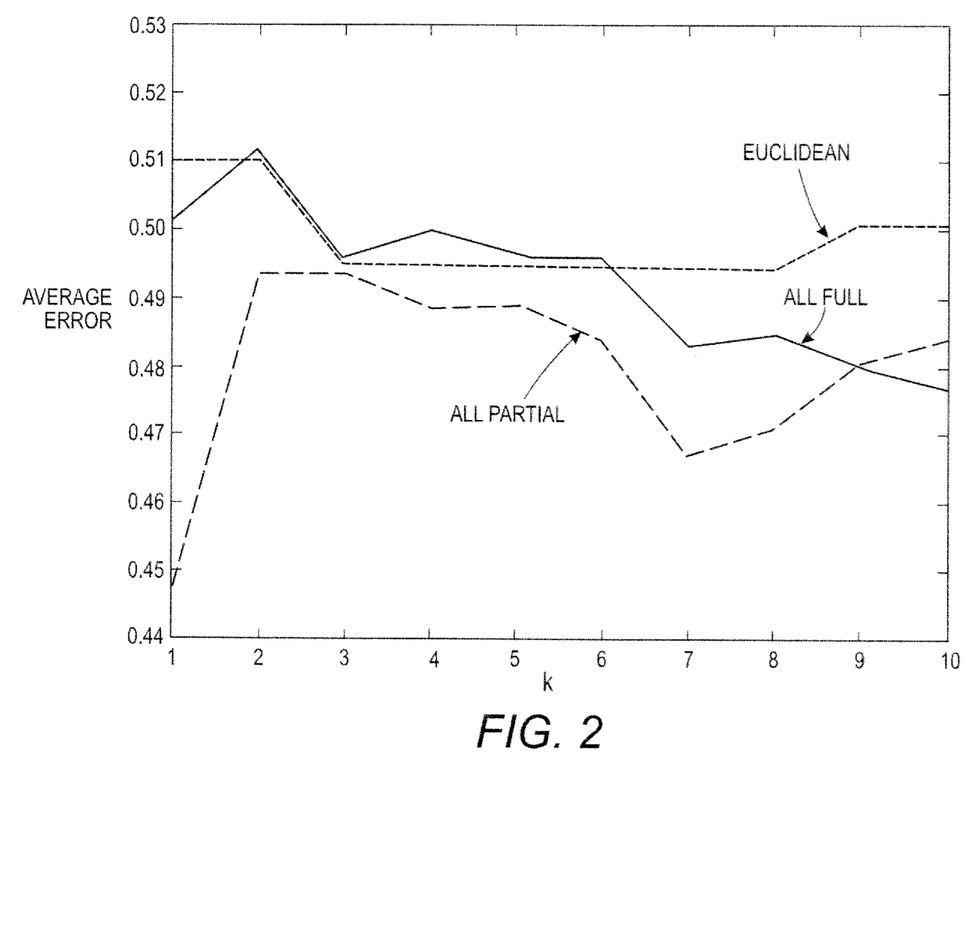
FIG. 2 plots global metric performance results.
Figure 3:
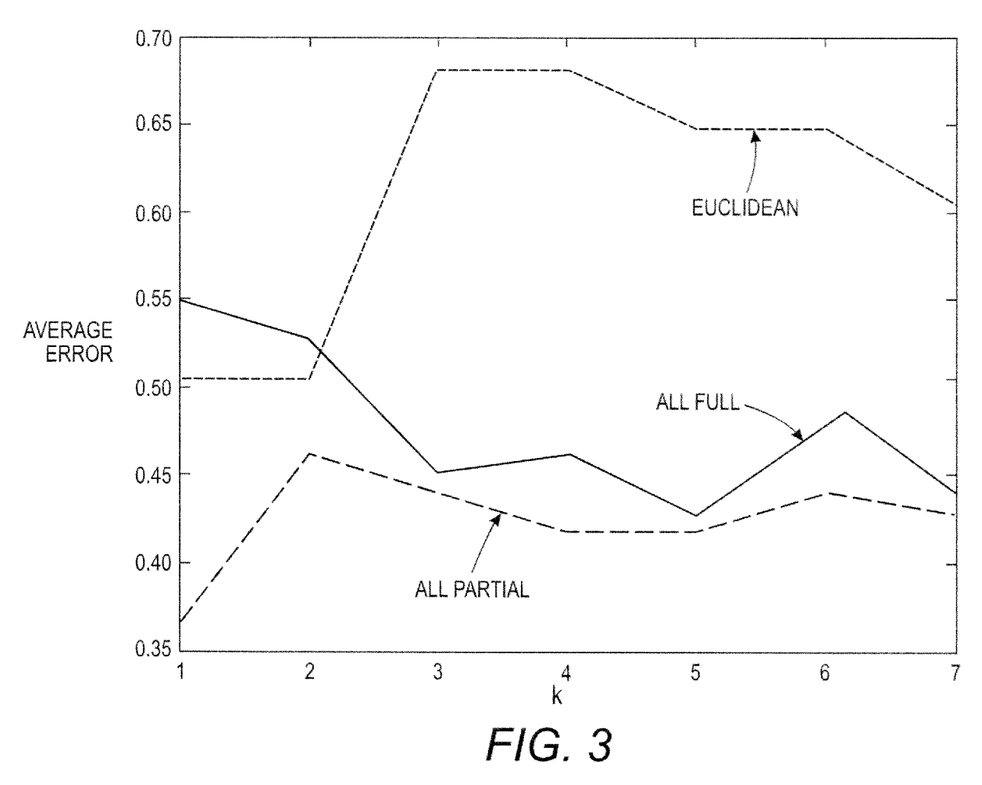
FIG. 3 plots local metric performance results.

FIGS. 2 and 3 show the prediction error for global and local cases, respectively, by compares the prediction errors. FIGS. 2 and 3 report the average prediction error (ordinate) for Euclidean and two Mahalanobis distances for different values of K (the abscissa). The local metrics (FIG. 3) yield a smaller recommendation error as compared to the global metric (FIG. 2). The smallest errors are achieved for small K values which yield 6-14% gain over the Euclidean distance.

In FIGS. 2 and 3, "AllPartial" denotes using the tag set overlap fraction $tov_q$, while "AllFull" denotes using the "all-or-nothing" overlap metric which equals 1 if the tag sets for images i and j are identical and 0 otherwise. Between AllFull an AllPartial methods, taking into account partial tag overlaps (the AllPartial data) helps reduce the recommendation error. (The PerTag method for handling multi-tag images was also tested, and performs generally the best on small sets, but the time needed to train the metric matrices for the Flickr® data are prohibitive and the method is not reported in FIGS. 2 and 3).

TABLE 2

KNN results compared with SVM results

| | Number of tags | | | | |
|---|---|---|---|---|---|
| | 5 tags | 10 tags | 20 tags | 50 tags | 100 tags |
| Precision (SVM) | 36.34 | 23.83 | 20.88 | 18.18 | 14.25 |
| Precision (KNN, $d_E$, C = $C_o$) | 78.50 | 75.06 | 64.86 | 61.83 | 54.49 |
| Precision (KNN, $d_E$, C = $C_c$) | 77.40 | 72.89 | 62.48 | 58.91 | 50.45 |
| Precision (KNN, $d_A$ with local training, C = $C_o$) | 79.83 | 78.18 | 67.67 | 62.46 | 56.82 |

Further evaluation testing incorporated the local Mahalanobis distance metric learning into the KNN approach and compared its performance to the SVM models learnt with the same sets of images. Tests were run in 5 folds on 500 randomly selected images; K is 5, the dataset is reduced to the top T=5, 10, 20, 50, 100 most frequent tags. Two tested versions of the KNN used the Euclidean distance $d_E$: one used the personal space C=$C_o$ (that is, the set of candidate neighboring images is equal to the set of images owned by the owner of the image to be tagged) while the other used the personal and social context C=$C_c$ (that is, includes the owner's images and also the owner contacts' images). The third tested version of KNN used the Mahalanobis distance $d_A$ with local training based on personal context (C=$C_o$) and the AllPartial method for multi-tag metric learning (i.e., using the tag set overlap fraction $tov_{ij}$). Table 2 reports the precision values for all tests. As Table 2 shows, the KNN methods considerably outperformed the SVM models, especially for larger numbers of tags. Incorporating the local Mahalanobis distance metric $d_A$ instead of the Euclidean distance metric $d_E$ yields 2-3° A) performance gain for K=5, with the gain up to 8% for K=1.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A non-transitory storage medium storing instructions executable by a processing device to perform a tag recommendation method operating in conjunction with an electronic social network including user accounts and tagged items, the user accounts including user-user contacts information and each tagged item being indexed in the electronic social network by an item owner of the tagged item wherein the item owner is a user of the electronic social network, the tag recommendation method comprising:
   for an item to be tagged that is indexed in the electronic social network by an item owner of the item to be tagged, generating at least one tag recommendation for the item to be tagged by:
      (1) selecting a set of candidate neighboring items in the electronic social network wherein the selecting of the set of candidate neighboring items is limited to one of:
         selecting items from the set of items whose item owner is the item owner of the item to be tagged,
         selecting items from a set of items consisting of a combination of the set of items whose item owner is the item owner of the item to be tagged and the set of items whose item owners are users of the electronic social network who are contacts in the electronic social network of the item owner of the item to be tagged, and
         selecting items from a set of items consisting of a combination of the set of items whose item owner is the item owner of the item to be tagged and the set of items whose item owners are users of the electronic social network having between one and N degrees of separation inclusive from the item owner of the item to be tagged in the user-user contacts information of the electronic social network where N is an integer greater than or equal to two,
      (2) selecting a set of nearest neighboring items from the set of candidate neighboring items that are nearest to the item to be tagged as measured by an item comparison metric, and
      (3) selecting the at least one tag recommendation from tags of the items of the set of nearest neighboring items; and
   displaying, on a display, the at least one tag recommendation for the item to be tagged.

2. The non-transitory storage medium as set forth in claim 1, wherein the selecting of the set of nearest neighboring items comprises:
   selecting K nearest neighboring items from the set of candidate neighboring items that are nearest to the item to be tagged as measured by the item comparison metric, where K is an integer greater than one.

3. The non-transitory storage medium as set forth in claim 2, wherein the item comparison metric comprises a Mahalanobis distance metric operating on feature vector representations of items.

4. The non-transitory storage medium as set forth in claim 1, wherein the item comparison metric comprises a Mahalanobis distance metric operating on feature vector representations of items.

5. The non-transitory storage medium as set forth in claim 4, wherein the generating further comprises training the Mahalanobis distance metric on the set of candidate neighboring items wherein the training comprises optimizing a parameter matrix of the Mahalanobis distance.

6. The non-transitory storage medium as set forth in claim 4, wherein the generating further comprises training the Mahalanobis distance metric on the set of candidate neighboring items to minimize an objective function comprising a sum of the outputs of the Mahalanobis distance metric operating on feature vector representations of candidate neighboring items with at least one overlapping tag.

7. The non-transitory storage medium as set forth in claim 4, wherein the generating further comprises training the Mahalanobis distance metric on the set of candidate neighboring items to optimize a correlation between the trained Mahalanobis distance between two items and a metric indicative of tag set overlap between the two items.

8. The non-transitory storage medium as set forth in claim 1, wherein the item to be tagged comprises an image to be tagged and the selecting of the set of candidate neighboring items comprises selecting a set of candidate neighboring images.

9. A tag recommendation method operating in conjunction with an electronic social network including user accounts and tagged items, the user accounts including user-user contacts information and each tagged item being indexed in the electronic social network by an item owner of the tagged item wherein the item owner is a user of the electronic social network, the tag recommendation method comprising:
   for an item to be tagged that is indexed in the electronic social network by an item owner of the item to be tagged, generating at least one tag recommendation for the item to be tagged by:
      training a Mahalanobis distance metric on a set of candidate neighboring items in the electronic social network wherein the training comprises optimizing a parameter matrix of the Mahalanobis distance to minimize an objective function comprising a sum of distances computed using the Mahalanobis distance metric between candidate neighboring items that share at least one tag by optimizing the semi-definite program comprising:

$$\min_A \Sigma_{(X_i;X_j)} \in {}_S d_A(X_i;X_j) + \Sigma_{(X_i;X_j;X_k)} \in {}_S \xi_{ijk} \text{ s.t. } d_A(X_i;X_k) - d_A(X_i;X_j) \geq \text{tov}_{ij} - \xi_{ijk} \text{ for all triples } (X_i;X_j;X_k)$$
$$\in {}_S A \geq 0, \xi_{ijk} \geq 0,$$

where S denotes the set of candidate neighboring items, $X_i$ and $X_j$ are feature vectors representing respective items i and j of the set of candidate neighboring items having at least one common tag, and $X_k$ is a feature vector representing an item k of the set of candidate neighboring items having no tag in common with item i and having no tag in common with item j, and $d_A$ is a Mahalanobis distance metric given by:

$$d_A(X_i;X_j) = (X_i - X_j)^T A(X_i - X_j)$$

where A is the parameter matrix of the Mahalanobis distance whose values are optimized by the training;
      selecting a set of nearest neighboring items from the set of candidate neighboring items that are nearest to the item to be tagged as measured by the trained Mahalanobis distance metric, and
      selecting the at least one tag recommendation from tags of the items of the set of nearest neighboring items;
      wherein the generating is performed by a digital processing device; and
   displaying, on a display, the at least one tag recommendation for the item to be tagged.

10. A tag recommendation method operating in conjunction with an electronic social network including user accounts and tagged items, the user accounts including user-user contacts information and each tagged item being indexed in the electronic social network by an item owner of the tagged item wherein the item owner is a user of the electronic social network, the tag recommendation method comprising:
   for an item to be tagged that is indexed in the electronic social network by an item owner of the item to be tagged, generating at least one tag recommendation for the item to be tagged by:
      training a Mahalanobis distance metric on a set of candidate neighboring items in the electronic social network to optimize a correlation between (i) the trained Mahalanobis distance between pairs of items i and j of the set of candidate neighboring items and (ii) an overlap metric measuring set overlap of the tag sets of the two items i and j wherein the overlap metric is proportional to $|T_i \cap T_j|$ where $T_i$ denotes the tag set associated with the item i and $T_j$ denotes the tag set associated with the item j,
      selecting a set of nearest neighboring items from the set of candidate neighboring items that are nearest to the item to be tagged as measured by the trained Mahalanobis distance metric, and
      selecting the at least one tag recommendation from tags of the items of the set of nearest neighboring items;
      wherein the generating is performed by a digital processing device; and
   displaying, on a display, the at least one tag recommendation for the item to be tagged.

11. The tag recommendation method as set forth in claim 10, wherein the training optimizes the semi-definite program comprising:

$$\min_A \Sigma_{(X_i;X_j)} \in {}_S d_A(X_i;X_j) + \Sigma_{(X_i;X_j;X_k)} \in {}_S \xi_{ijk} \text{ s.t. } d_A(X_i;X_k) - d_A(X_i;X_j) \geq \text{tov}_{ij} - \xi_{ijk} \text{ for all triples } (X_i;X_j;X_k)$$
$$\in {}_S A \geq 0, \xi_{ijk} \geq 0,$$

where S denotes the set of candidate neighboring items, $X_i$ and $X_j$ are feature vectors representing respective items i and j of the set of candidate neighboring items having at least one common tag, and $X_k$ is a feature vector representing an item k of the set of candidate neighboring items having no tag in common with item i and having no tag in common with item j, and $d_A$ is a Mahalanobis distance metric given by:

$$d_A(X_i;X_j) = (X_i - X_j)^T A(X_i - X_j)$$

where A is a parameter matrix whose values are optimized by the training.

12. The tag recommendation method as set forth in claim 10, wherein the overlap metric between the two items i and j of the set of candidate neighboring items is proportional to:

$$|T_i \cap T_j|/(|T_i| + |T_j|).$$

13. The tag recommendation method as set forth in claim 9, wherein the generating further comprises:
   selecting the set of candidate neighboring items from one of:
      the set of items whose item owner is the item owner of the item to be tagged,
      a set of items consisting of a combination of the set of items whose item owner is the item owner of the item to be tagged and the set of items whose item owners are users of the electronic social network who are contacts in the electronic social network of the item owner of the item to be tagged, and
      a set of items consisting of a combination of the set of items whose item owner is the item owner of the item to be tagged and the set of items whose item owners are users of the electronic social network having between one and N degrees of separation inclusive from the item owner of the item to be tagged in the user-user contacts information of the electronic social network where N is an integer greater than or equal to two.

14. The tag recommendation method as set forth in claim 9, wherein the selecting of the set of nearest neighboring items comprises:

selecting K nearest neighboring items from the set of candidate neighboring items that are nearest to the item to be tagged as measured by the trained Mahalanobis distance metric, where K is an integer greater than one.

* * * * *